United States Patent [19]

Grove

[11] Patent Number: 4,733,531
[45] Date of Patent: Mar. 29, 1988

[54] LIQUID-PROPELLANT MANAGEMENT SYSTEM WITH CAPILLARY PUMPING VANES

[75] Inventor: R. K. Grove, Los Altos, Calif.

[73] Assignee: Lockheed Missiles & Space Company, Inc., Sunnyvale, Calif.

[21] Appl. No.: 839,831

[22] Filed: Mar. 14, 1986

[51] Int. Cl.$^4$ .................... F02K 9/00; E03B 11/00; F17D 1/00

[52] U.S. Cl. .................... 60/259; 137/154; 137/590

[58] Field of Search ............ 60/259; 137/154, 590, 137/209, 206, 574, 576, 171, 183; 417/118

[56] References Cited

U.S. PATENT DOCUMENTS

| | | | |
|---|---|---|---|
| 3,843,024 | 10/1974 | Barber | 417/118 |
| 4,168,718 | 9/1979 | Hess et al. | 137/590 |
| 4,399,831 | 8/1983 | Robert | 137/590 |
| 4,489,745 | 12/1984 | Netter et al. | 137/590 |

OTHER PUBLICATIONS

Rollins et al., "Design & Qualification of the Arabsat Propellant Tank", A1AA-84-1480, 6-84.

Primary Examiner—Louis J. Casaregola
Assistant Examiner—Donald E. Stout
Attorney, Agent, or Firm—John J. Morrissey

[57] ABSTRACT

In a liquid-propellant management system for providing substantially gas-free liquid propellant to thrusters of a space vehicle, a storage tank (10) has an opening (11) through which liquid propellant is delivered via a line (13) to the thrusters. A trap (14) is secured within the tank (10) adjacent the opening (11). and an exit port (15) of the trap (14) is aligned with the opening (11) of the tank (10). A liner (16) is secured inside the trap (14) to define a volume between an interior surface portion of the trap (14) and the liner (16), which volume communicates via the exit port (15) and the opening (11) with the line (13). Liquid propellant enters into the trap (14) through an inlet window screen (27), and passes through porous windows (28) in the liner (16) into the volume between the trap (14) and the liner (16). Vanes (19) are secured to the exterior surface of the trap (14) and extend into the interior of the tank (14) and the liner (16). Vanes (19) are secured to the exterior surface of the trap (14) and extend into the interior of the tank (10). An elongate edge of each vane (19) is spaced apart from the interior wall of the tank (10) by a capillary distance. As the tank (10) approaches an empty status, liquid propellant collected on the interior wall of the tank (10) spreads to the capillary spacings between the interior wall of the tank (10) and the elongate edges of the vanes (19). The liquid propellant is pumped by capillary action between the vanes (19) and the interior wall of the tank (10) to the exterior surface of the trap (14).

4 Claims, 6 Drawing Figures

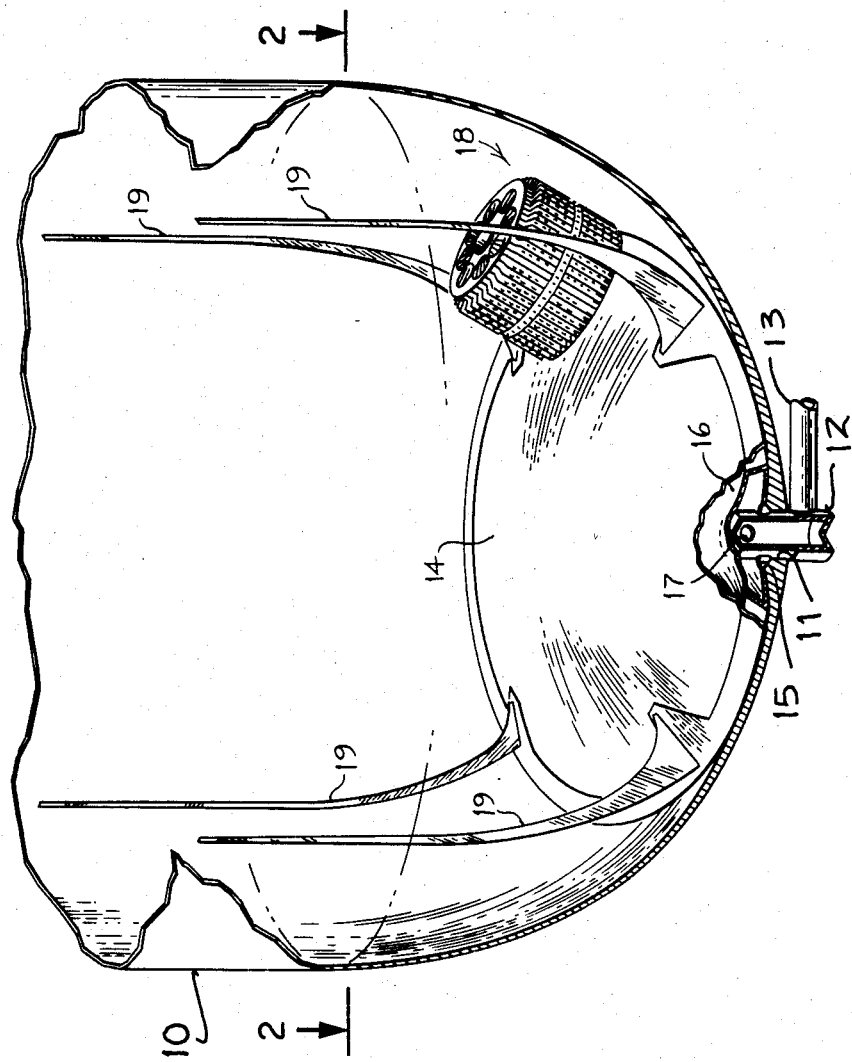
FIG_1A
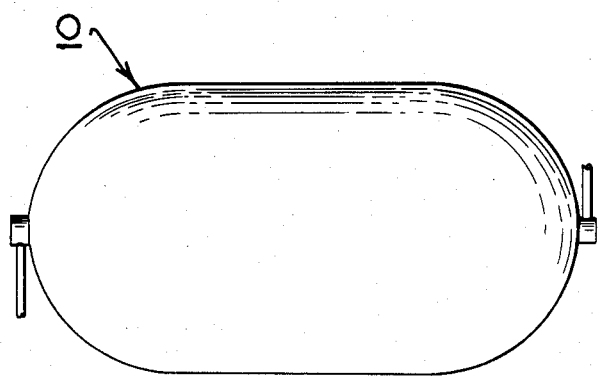
FIG_1

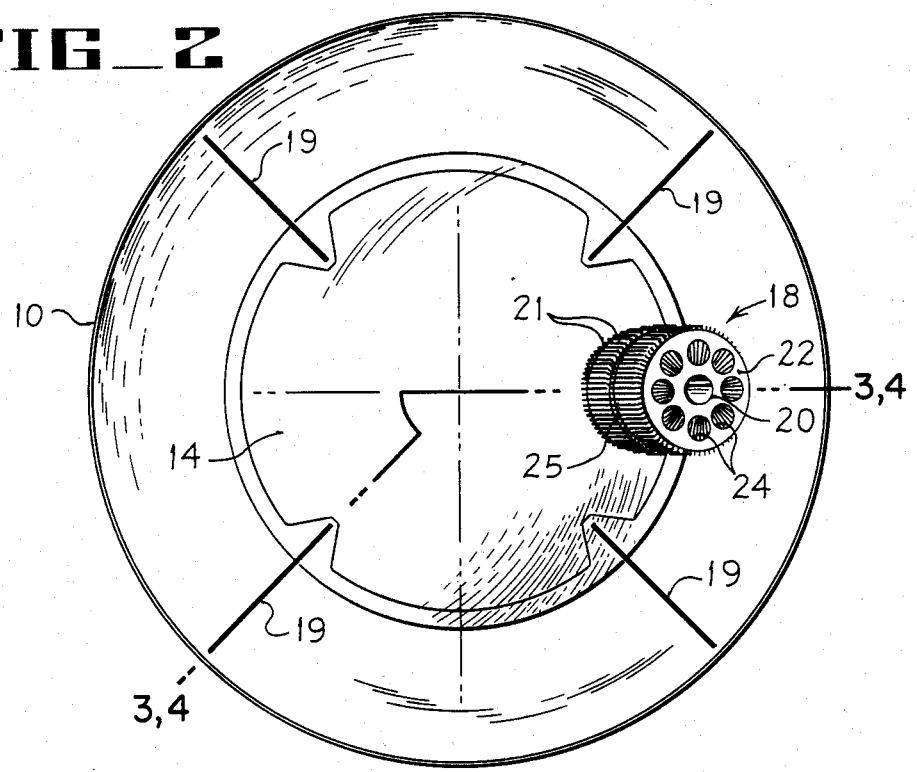
FIG_2
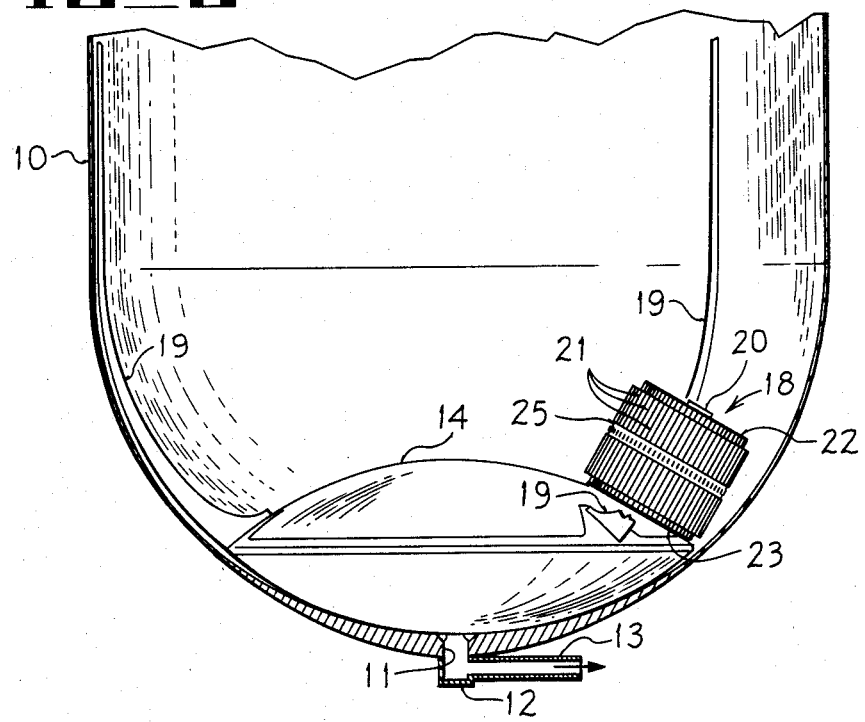
FIG_3

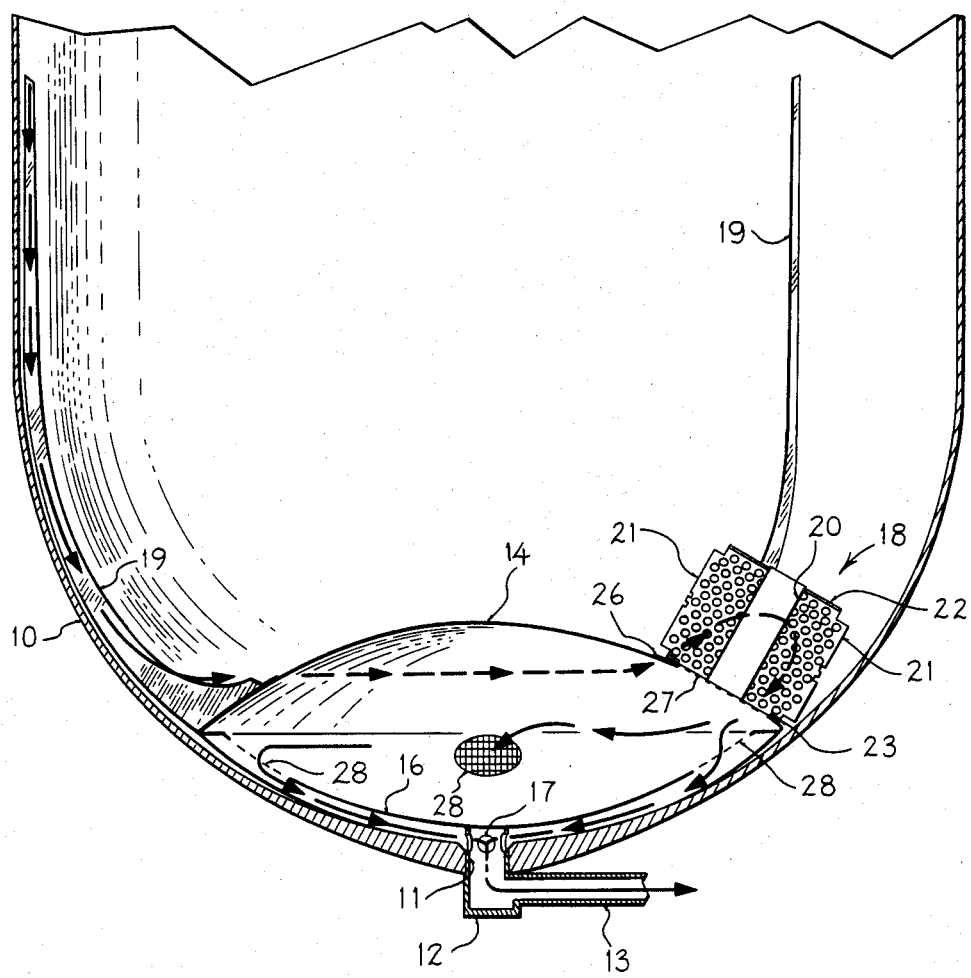
FIG_4

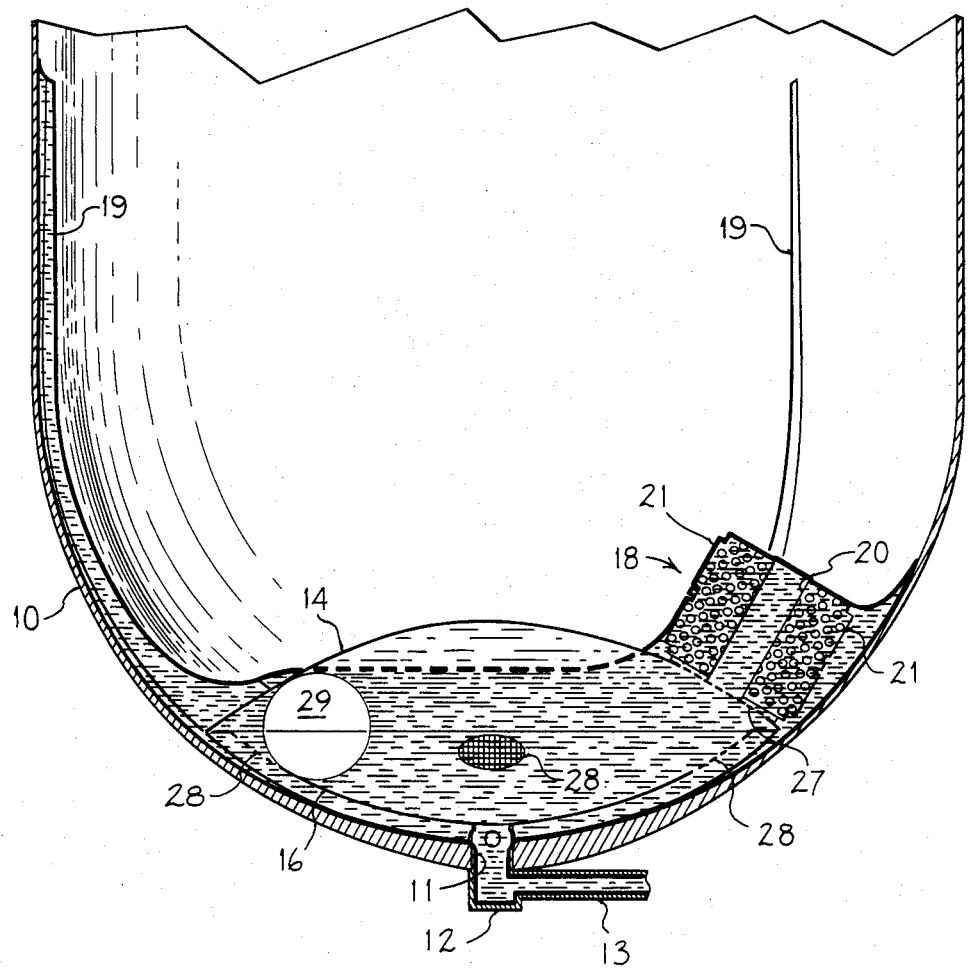
FIG_5

LIQUID-PROPELLANT MANAGEMENT SYSTEM WITH CAPILLARY PUMPING VANES

TECHNICAL FIELD

This invention relates generally to liquid-propellant management systems for space vehicles, and more particularly to a capillary pumping technique for providing a continuous supply of liquid propellant to a trap inside a liquid-propellant storage tank on a space vehicle.

BACKGROUND OF THE INVENTION

In co-pending U.S. patent application Ser. No. 665,657, filed 10/29/84, now allowed, a liquid-propellant management system was described in which liquid propellant is controllably expelled by means of pressurant gas from a rigid-walled storage tank to the thrusters of a space vehicle in such a way that substantially gas-free liquid propellant is delivered to the thrusters without interruption during accelerations involving rapid changes in speed and/or direction.

The liquid-propellant management system described in U.S. patent application Ser. No. 665,657 comprises a hollow storage tank, a hollow trap of lenticular configuration (i.e., of clam-shell shape, with a spherical shape being the limiting case), and a trap liner. The trap is positioned inside the storage tank at a polar region thereof (i.e., so as to occupy an end portion of an elongate tank, or considerably less than a hemispheric portion of a spherical tank), and the trap liner is positioned inside the trap.

The storage tank of the system described in U.S. patent application Ser. No. 665,657 has a first opening connectable to a so-called "pressurant and vent" line for pressurant gas, and a second opening connectable to a so-called "fill, drain and feed" line for liquid propellant. The trap is secured within the storage tank in the vicinity of the "fill, drain and feed" line, and an exit port of the trap is aligned with the second opening in the tank so as to communicate with the "fill, drain and feed" line. The liner is secured to the interior wall of the trap circumjacent a porous inlet window, and is configured generally in conformity with the contour of the interior wall of the trap. Except where the liner is secured circumjacent the inlet window, the liner is spaced apart from the interior wall of the trap to define a volume between the liner and the trap. The inlet window of the trap admits liquid propellant from the storage tank into the interior of the liner. The liner has a plurality of porous outlet windows, which permit flow of liquid propellant from the interior of the liner into the volume between the exterior wall of the liner and the interior wall of the trap. Liquid propellant is then expelled from the volume between the liner and the trap via the exit port of the trap to the "fill, drain and feed" line for delivery as needed to the thrusters of the space vehicle.

The inlet window of the trap and the outlet windows of the liner of the liquid-propellant management system of U.S. patent application Ser. No. 665,657 have capillary pores, which permit liquid propellant that comes into contact with the windows to pass therethrough. The pores are dimensioned so that, when liquid propellant stored in the storage tank and/or in the trap is not in contact with the windows (as may occur during accelerations with less than a full storage tank), a film of liquid propellant is maintained across each pore by surface tension after the windows have been wetted by the liquid propellant. The films of liquid propellant across the pores of the inlet window of the trap act as a barrier to the entry of pressurant gas from the interior of the tank outside the trap into the interior of the liner inside the trap. Similarly, the films of liquid propellant across the pores of the liner windows prevent any pressurant gas that may be inside the liner from entering into the volume between the liner and the trap.

SUMMARY OF THE INVENTION

For economy in terms of payload weight as well as propellant cost, it is desirable that as much as possible of the liquid propellant stored in the storage tank of a liquid-propellant management system of the type described in U.S. patent application Ser. No. 665,657 for a space vehicle be made available for delivery to the thrusters of the space vehicle. In particular, as the storage tank approaches empty status, it is desirable that every last bit of liquid propellant in the storage tank that can possibly be delivered to the inlet window of the trap be so delivered. The present invention provides a technique for pumping liquid propellant by capillary action from regions of the storage tank that are remote from the inlet window of the trap to the surface of the trap at a polar region of the storage tank, and for pumping by capillary action across the surface of the trap to the vicinity of the inlet window for admission into the interior of the trap.

In accordance with the present invention, vanes extend from the surface of the trap into the interior of the storage tank of a liquid propellant management system as described in U.S. patent application Ser. No. 665,657. The number of vanes is selected on the basis of the size of the storage tank. Each vane has an elongate edge, which is contoured generally in conformity with the interior wall of the storage tank in the vicinity of the trap, and which is separated from the interior wall of the storage tank by a capillary spacing (i.e., by a spacing sufficiently small so that liquid propellant collected between the wall of the storage tank and the elongate edge of the vane is pumped by capillary action via that spacing to the exterior surface of the trap).

During low-gravitiy, low acceleration travel (i.e., "coasting") of the space vehicle in extraterrestrial space (e.g., where the space vehicle is a satellite in geosynchronous orbit), liquid propellant that is being managed according to the present invention forms fillets at the junctions between the vanes and the exterior surface of the trap. As liquid propellant is pumped by capillary action to the exterior surface of the trap via the spacings between the vanes and the wall of the storage tank, each of the fillets increases in size. As capillary pumping continues, each fillet extends further over the exterior surface of the trap in the region between the interior wall of the storage tank and the exterior surface of the trap. Eventually the fillets merge with each other, and extend over the exterior surface of the trap to the vicinity of the trap inlet window.

In a preferred embodiment of the present invention, a sponge structure (which may be of conventional design) is positioned adjacent the inlet window of the trap to collect liquid propellant that is pumped by the vanes (i.e., via the spacings between the vanes and the interior wall of the storage tank) to the exterior surface of the trap. The sponge structure is essentially a collection of metal panels arranged so that adjacent panels are spaced apart from each other by a capillary distance, and so that each of the panels is separated by a capillary distance from the surface of the trap in the vicinity of the trap inlet window.

The sponge structure absorbs liquid propellant by capillary action from the exterior surface of the trap in the vicinity of the trap inlet window, and thereby enables additional liquid propellant to be pumped by the vanes (i.e., via the spacings between the vanes and the interior wall of the storage tank) to the fillets at the junctions of the vanes with the exterior surface of the trap. The sponge structure stores the absorbed liquid propellant, which thereby becomes available for delivery by capillary action into the trap in order to replenish the trap as liquid propellant is withdrawn therefrom to meet the demand of the space vehicle thrusters.

During low-gravity, low-acceleration "coasting" of the space vehicle, the pumping of liquid propellant to the exterior surface of the trap via the capillary spacings between the vanes and the interior wall of the storage tank occurs without interruption. Liquid propellant is thereby gathered from regions of the storage tank remote from the inlet window of the trap to the sponge structure adjacent the inlet window of the trap for delivery into the interior of the trap.

DESCRIPTION OF THE DRAWING

FIG. 1 is a side view of a rigid-walled tank for liquid propellant used in maneuvering a space vehicle.

FIG. 1A is a perspective view of a portion of the tank of FIG. 1, which is cut away to illustrate a liquid-propellant management system according to the present invention in which a trap is positioned at a polar region within the tank, where the trap communicates with a feed line through which liquid propellant is delivered to thrusters for maneuvering the space vehicle, and where capillary pumping vanes are secured to an exterior surface portion of the trap and extend adjacent the interior wall of the tank into regions of the tank remote from the trap.

FIG. 2 is a plan view of the trap of the liquid-propellant management system of FIG. 1 as viewed from line 2—2 of FIG. 1.

FIG. 3 is an elevation view of the trap of the liquid-propellant management system of FIG. 1 as seen in a cross-sectional view of the storage tank along line 3—3 of FIG. 2.

FIG. 4 is a cross-sectional view of the portion of the liquid-propellant management system of FIG. 1 along line 4—4 of FIG. 2, wherein flow directions for the liquid propellant are indicated by arrows.

FIG. 5 is a cross-sectional view of the portion of the liquid-propellant management system as shown in FIG. 4, where the formation of a fillet of liquid propellant at the junction between a capillary pumping vane and the exterior surface of the trap is illustrated.

BEST MODE OF CARRYING OUT THE INVENTION

A liquid-propellant management system according to the present invention is generally of the type described in U.S. patent application Ser. No. 665,657, and comprises a hollow storage tank 10 as shown in FIG. 1 within which a hollow trap is positioned. The improvement of the present invention comprises the use of vanes, which are attached to an exterior surface of the trap for pumping liquid propellant by capillary action from regions of the tank 10 remote from the trap to positions on the exterior surface of the trap spaced apart from an inlet window on the trap. The liquid propellant then spreads over the exterior surface of the trap to the inlet window for entry into the interior of the trap.

A preferred embodiment of the present invention is illustrated in FIG. 1A, which provides a cut-away perspective view of a polar region of the tank 10. As seen in FIG. 1A, the tank 10 has an opening 11 in which a fitting 12 is secured to provide a liquid-tight connection with a so-called "fill, drain and feed" line 13. The tank 10 has another opening (indicated at the top of FIG. 1) through which a gas-tight connection is provided with a so-called "pressurant and vent" line, as described in U.S. patent application Ser. No. 665,657.

Inside the tank 10 at a polar region thereof as shown in FIG. 1A, a hollow trap 14 is secured (as by welding) to a portion of the interior wall of the tank 10 adjacent the opening 11. The trap 14 has an exit port 15, which is aligned with the opening 11 in the tank 10. A liner 16 is provided adjacent an interior surface portion of the trap 14 to define a volume between the liner 16 and the trap 14. The volume between the liner 16 and the trap 14 communicates with the "fill, drain and feed" line 13 via apertures 17 in the fitting 12. The trap 14 shown in FIG. 1A has a clam-shell shape, which is a design feature of the embodiment illustrated. However, in principle the trap 14 is of lenticular configuration, which would permit a spherical shape as the limiting case in an appropriate application.

The trap 14 has an inlet window, which in the perspective of FIG. 1A is blocked from view by a sponge structure 18. The inlet window admits liquid propellant from the interior of the tank 10 outside the trap 14 into the interior of the trap 14. In the embodiment illustrated in FIG. 1A, the liner 16 is contoured generally in conformity with the interior surface of one of the "half-shell" portions comprising the clam-shell trap 14, and is secured to the interior surface of the trap 14 along a seam at the junction of the two "half-shell" portions comprising the trap 14. However, in an alternative embodiment, the trap could be spherical and the liner could be secured to the interior surface of the trap circumjacent the inlet window so as to define a volume between the liner and substantially the entire interior surface (except for the inlet window) of the trap. The sponge structure 18, whose function is discussed hereinafter, is secured to the exterior wall of the trap 14 circumjacent the inlet window.

In accordance with the present invention, vanes 19 are secured to the exterior surface of the trap 14 and extend into the interior of the tank 10 adjacent the interior wall thereof. The number of vanes 19 is determined by the size of the tank 10 and by the area of the exterior surface of the trap 14. For the clam-shell trap 14 illustrated in FIG. 1A, four vanes 19 are shown disposed symmetrically at 90-degree intervals around the periphery thereof. Each vane 19 is a flat metal structure having a relatively wide proximal end secured (as by welding) to the exterior surface of the trap 14, and a relatively narrow distal end that projects into the interior of the tank 10. An elongate edge of each vane 19 is contoured generally in conformity with the configuration of the interior wall of the tank 10, and is spaced apart therefrom by a capillary distance (i.e., by a distance small enough so that liquid propellant collected between the elongate edges of the vanes 19 and the interior wall of the tank 10 is pumped toward the exterior surface of the trap 14 by capillary action).

In the preferred embodiment of the present invention, the capillary distance by which the elongate edge of each vane 19 is separated from the interior wall of the tank 10 varies progressively from a relatively wide capillary distance at the distal end to a relatively narrow capillary distance at the proximal end of the vane 19. In this way, capillary pumping of liquid propellant by the vanes 19 via the spacings between the elongate edges of the vanes 19 and the interior wall of the tank 10 is biased toward the exterior surface of the trap 14.

In FIG. 2, the trap 14 is seen in plan view from a vantage point inside the tank 10. The vanes 19 are shown attached to the exterior surface of the trap 14 so as to project (upward from the plane of the paper in the plan view of FIG. 2) into the interior of the tank 10. Each vane 19 is seen to be spaced apart from the interior wall of the tank 10 by a capillary distance.

FIG. 3 provides an elevation view of the trap 14 as seen by taking a non-planar cross section of the tank 10, as indicated by the non-straight line 3,4—3,4 in FIG. 2. Three of the four vanes 19 shown in FIGS. 1A and 2 can be seen in the non-planar cross-sectional view of FIG. 3. One of the vanes 19 is completely visible in FIG. 3, and is seen to have an elongate edge that is separated from the interior wall of the tank 10 by a capillary distance that progressively increases with increasing distance from the trap 14. A fragmentary portion of the proximal end of another one of the vanes 19 is seen in the foreground of FIG. 3 (i.e., in front of the sponge structure 18). The proximal end of the third vane 19 visible in FIG. 3 is blocked from view by the sponge structure 18, which is seen to be mounted on the exterior surface of the trap 14 circumjacent the trap inlet window.

The sponge structure 18 is a conventional device, and in the preferred embodiment comprises a hollow right-circular metal cylinder 20 to which planar metal panels 21 are secured (as by welding) in longitudinally extending radial disposition with respect to the axis of the cylinder 20. The panels 21 are preferably apertured (as illustrated in FIG. 4, which is discussed hereinafter) in order to permit flow of liquid propellant transversely through the sponge structure 18 when sufficient liquid propellant is present in the tank 10.

The number of panels 21 in the sponge structure 18 is determined by the requirement that the maximum spacing between adjacent panels 21 at the radially outward perimeter of the sponge structure 18 is a capillary distance, whereby liquid propellant collected between adjacent panels 21 is pumped by capillary action radially inward toward the exterior surface of the cylinder 20. To provide rigidity for the sponge structure 18, the panels 21 are sandwiched between annular cover plates 22 and 23. The cover plate 22 has a central hole dimensioned to fit over one end of the cylinder 20, and the cover plate 23 has a central hole dimensioned to fit over the other end of the cylinder 20. The cover plates 22 and 23 are secured (as by welding) to the opposite ends of the cylinder 20. Symmetrically arranged apertures 24 (as seen in FIG. 2) are provided on the cover plates 22 and 23 in order to lighten weight, and in order to permit liquid propellant to pass longitudinally through the sponge structure 18 to the inlet window of the trap 14. A slotted band 25 encircles the radially outer edges of the panels 21 around the periphery of the sponge structure 18, and a tab on the outer edge of each panel 21 is received in a corresponding slot on the band 25 so as to maintain uniform angular spacing between adjacent panels 21.

FIG. 4 shows a cross section of the liquid-propellant management system of the present invention taken along the same non-planar section as in FIG. 3, but with cuts through the trap 14 and through the sponge structure 18 as well as through the tank 10. The annular cover plate 23 of the sponge structure 18 is seen in FIG. 4 to be seated upon and secured to a "doubler" or lip 26 on the exterior surface of the trap 14 surrounding the inlet window. A screen 27 is fitted in the inlet window, and is secured to the trap 14 around the perimeter of the inlet window. (In an alternative embodiment, a porous element such as a perforated or sintered plate could be used in place of the screen 27.) The screen 27 has pores dimensioned so that, after the screen 27 has been wetted by liquid propellant, a film of liquid propellant remains across each pore due to surface tension when the quantity of liquid propellant in the tank 10 has been depleted so as to be no longer in contact with the screen 27.

The screen 27, after having been wetted by the liquid propellant, acts as a barrier to entry of pressurant gas from the interior of the tank 10 into the interior of trap 14. Windows 28 are provided in the liner 16 to permit flow of liquid propellant outward from the interior of the trap 14 into the volume between the liner 16 and the interior wall of the "half-shell" portion of the trap 14. The windows 28 are likewise fitted with porous screens, which (after having been wetted by the liquid propellant) serve as a barrier to the passage of pressurant gas from the trap 14 into the "fill, drain and feed" line 13 when the trap 14 is no longer full of liquid propellant.

Flow directions for liquid propellant as the tank 10 approaches empty status are indicated by arrows in FIG. 4. As the space vehicle undergoes accelerations, liquid propellant within the tank 10 outside the trap 14 collects on the interior wall of the tank 10. The collected liquid propellant then spreads along the interior wall of the tank 10, and enters the capillary spacings between the interior wall of the tank 10 and the adjacent edges of the vanes 19. The liquid propellant in the capillary spacings is then pumped by capillary action toward the exterior surface of the trap 14. This pumping action draws additional liquid propellant on the interior wall of the tank 10 into the capillary spacings between the interior wall and the edges of the vanes 19.

At the junction between each of the vanes 19 and the exterior surface of the trap 14, the liquid propellant forms a fillet which fills the region in the vicinity of the proximal end of each of the vanes 19 between the interior wall of the tank 10 and the exterior surface of the trap 14. As capillary pumping continues, the fillets spread and merge with each other. Eventually, the merging fillets of liquid propellant extend over the exterior surface from the peripheral region of the trap 14 adjacent the interior wall of the tank 10 to the vicinity of the trap inlet window. During non-acclerating (or low-accelerating) travel of the space vehicle in the low-gravity environment of extraterrestrial space, fillets of liquid propellant formed at the junctions of the vanes 19 with the exterior surface of the trap 14 can grow several orders of magnitude larger than would be possible in a terrestrial environment.

When the merging fillets of liquid propellant reach the inlet window of the trap 14, liquid propellant enters into the interior of the trap 14 through the porous screen 27. As shown by the arrows in FIG. 4, liquid propellant then passes from the interior of the trap 14 via the windows 28 into the volume between the exterior wall of the liner 16 and the interior wall of the trap 14. Liquid propellant is drawn from the volume between the exterior wall of the liner 16 and the interior wall of the trap 14 via the exit port 15 to the "fill, drain and feed" line 13 as required by the thrusters of the space vehicle. Broken arrows in FIG. 4 indicate the flow of liquid propellant over the portion of the exterior surface of the trap 14 that is hidden from view in the perspective of FIG. 4. Other broken arrows in FIG. 4 indicate the flow of liquid propellant through the interior portions of the sponge structure 18.

In FIG. 5, a fillet of liquid propellant formed between one of the vanes 19 and the exterior surface of the trap 14 is illustrated. At the vicinity of the inlet window of the trap 14, liquid propellant is pumped by capillary action from the exterior surface of the trap 14 into the spaces between adjacent panels 21 of the sponge structure 18. As a quantity of liquid propellant is withdrawn from the trap 14 to meet requirements of the thrusters of the space vehicle, an equal quantity of liquid propellant is drawn by capillary action from the spaces between adjacent panels 21 to the external surface of the cylinder 20, and thence along the external surface of the cylinder 20 toward the porous screen 27 in the inlet window of the trap 14. The liquid propellant then passes through the screen 27 into the interior of the trap 14.

A bubble 29 is shown in FIG. 5 to be "submerged" in the liquid propellant inside the trap 14. The bubble 29 represents a void that occurs within the trap 14 as liquid propellant is withdrawn therefrom without being replenished, as the tank 10 is emptied. The location of the bubble 29 is determined by the net acceleration experienced by the space vehicle. During "coasting" travel of the space vehicle in extraterrestrial space, the bubble 29 is generally submerged in the liquid propellant because of the domination of surface tension forces over acceleration forces associated with the travel of the space vehicle. When the tank 10 is upright in a terrestrial environment, the dominating force of gravity causes the bubble 29 to form at the "top" of the trap 14.

In a particular application, as many vanes 19 should be used as would be appropriate to pump the maximum practicable amount of liquid propellant from the interior of the tank 10 outside the trap 14 into the interior of the trap 14. The apparatus described above manages the liquid propellant contained therein without regard to the fact that the liquid is a propellant. Thus, it should be apparent that a liquid management system in accordance with the present invention could be utilized for delivering gas-free liquid other than a propellant for use or consumption in an appropriate alternative application.

The present invention has been described above in terms of a particular embodiment. However, other embodiments within the scope of the invention would be apparent to practitioners skilled in the art upon perusal of the foregoing description and the accompanying drawing. Therefore, the foregoing description and the drawing are merely illustrative of the invention, which is more generally defined by the following claims and their equivalents.

I claim:

1. In a liquid-propellant management system for a space vehicle, said system comprising:
   (a) a hollow tank defining a volume for storage of liquid propellant, said tank having a first opening and a second opening, said first opening being connectable to a first line through which said liquid propellant can be expelled from said tank to thrusters for maneuvering said space vehicle, said second opening being connectable to a second line through which pressurized gas can be introduced into said tank to effect expulsion of said liquid propellant from said tank via said first line to said thrusters;
   (b) a hollow trap of generally lenticular configuration positioned within said tank, said trap having a porous inlet window for said liquid propellant and an exit port for said liquid propellant, said trap being disposed in a polar region of said tank and being secured to said tank so that said exit port of said trap is aligned with said first opening of said tank, said inlet window having pores dimensioned to permit passage of said liquid propellant therethrough, said pores maintaining a barrier of said liquid propellant on said inlet window by surface tension when liquid propellant is not passing therethrough, said barrier substantially precluding passage of said gas therethrough, whereby substantially gas-free liquid propellant can pass through said exit port of said trap and through said first opening of said tank to said first line; and
   (c) a liner positioned within said trap, said liner being secured to an interior wall of said trap so as to define a first volume and a second volume within said trap; said first volume being bounded by a first side of said liner, a corresponding first portion of said interior wall of said trap and said porous inlet window of said trap; said second volume being bounded by a second side of said liner, a corresponding second portion of said interior wall of said trap and said exit port of said trap; said liner having a porous window for passage of said liquid propellant therethrough from said first volume into said second volume within said trap, said porous window of said liner serving as a barrier to preclude passage of said gas therethrough when said porous window is wetted by said liquid propellant; said system further comprising a vane, a proximal end of said vane being attached to an exterior surface portion of said trap at a position spaced apart from said inlet window, a distal end of said vane extending into said volume within said tank outside said trap beyond said polar region of said tank, said vane having an elongate edge that is spaced apart from an interior wall portion of said tank by a capillary distance so that liquid propellant collected between said interior wall portion of said tank and said elongate edge of said vane is pumped by capillary action to said position on said exterior surface portion of said trap spaced apart from said inlet window of said trap, whereupon said liquid propellant spreads over said exterior surface portion of said trap to said inlet window of said trap for entry into said first volume within said trap.

2. The apparatus of claim 1 wherein said capillary distance by which said elongate edge of said vane is spaced apart from said interior wall portion of said tank changes from a relatively wide capillary distance at said distal end of said vane remote from said exterior surface portion of said trap to a relatively narrow capillary distance at said proximal end of said vane attached to said exterior surface portion of said trap.

3. The apparatus of claim 2 comprising a plurality of said vanes attached to said exterior surface portion of said trap at positions spaced apart from each other and spaced apart from said inlet window of said trap.

4. The apparatus of claim 1 further comprising a sponge structure secured to said trap adjacent said inlet window of said trap, said sponge structure comprising means for collecting liquid propellant that has spread over said exterior surface portion of said trap and for delivering said liquid propellant through said inlet window into said trap.

* * * * *